United States Patent
Altman et al.

(10) Patent No.: US 6,381,691 B1
(45) Date of Patent: Apr. 30, 2002

(54) METHOD AND APPARATUS FOR REORDERING MEMORY OPERATIONS ALONG MULTIPLE EXECUTION PATHS IN A PROCESSOR

(75) Inventors: Erik Altman; Michael K. Gschwind, both of Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/374,255

(22) Filed: Aug. 13, 1999

(51) Int. Cl.$^7$ .............................................. G06F 9/312
(52) U.S. Cl. ...................... 712/236; 912/216
(58) Field of Search ................. 712/236, 216, 712/23; 717/6

(56) References Cited

U.S. PATENT DOCUMENTS

| | | | | |
|---|---|---|---|---|
| 5,119,495 A | * | 6/1992 | King ............................. | 717/9 |
| 5,642,512 A | * | 6/1997 | Tanaka ........................... | 717/5 |
| 5,721,893 A | * | 2/1998 | Holler ........................... | 712/239 |
| 5,758,051 A | | 5/1998 | Moreno et al. ............... | 395/181 |
| 5,930,507 A | * | 7/1999 | Nakahira ........................ | 717/5 |
| 6,189,088 B1 | * | 2/2001 | Gshwind ....................... | 712/216 |
| 6,260,190 B1 | * | 7/2001 | Ju ................................. | 717/7 |

OTHER PUBLICATIONS

Klauser et al. "Selective Eager Execution on the PolyPath Architecture", 25$^{th}$ Annual International Symposium on Computer Architecture, pp. 250–259, (1998).
Ebcioglu et al. "An Eight–Issue Tree–VLIW Processor for Dynamic Binary Translation", International Conference on Computer Design (Oct. 1998).
T.F. Chen "Supporting Highly Speculative Execution via Adaptive Branch Trees", Fourth International Symposium on High–Performance Computer Architecture, pp. 185–194 (1998).
Moudgill et al. "Register Renaming and Dynamic Speculation: An Alternative Approach", Proceedings of the 26$^{th}$ Annual International Symposium on Microarchitecture, pp. 202–213 (Dec. 1993).
Uht et al. "Disjoint Eager Execution: An Optimal Form of Speculative Execution", Proceedings of the 28$^{th}$ International Symposium on Microarchitecture, pp. 1–13 (Nov./Dec. 1995).

* cited by examiner

*Primary Examiner*—Eric Coleman
(74) *Attorney, Agent, or Firm*—F. Chau & Associates, LLP (57) ABSTRACT

A method is provided for scheduling instructions for execution along multiple paths in a Computer processing system implementing out-of-order execution. The method includes the step of selecting and moving a next instruction from its current position in a sequence of instructions to an earlier position. It is determined whether the selected instruction may reference a memory location for read-access. It is determined whether the selected instruction was previously moved over a non-selected instruction which may ambiguously reference the memory location, when the selected instruction may reference the memory location for read-access. It is determined whether the selected instruction was previously moved over a branch instruction, when the selected instruction was previously moved over the non-selected instruction. A record of the selected instruction is stored for future reference, when the selected instruction was previously moved over the branch instruction. The record includes a path specifier for indicating a path from a current locus of execution to a basic block corresponding to a in-order position of the selected instruction.

28 Claims, 6 Drawing Sheets

| Valid | Address | Data Size | Interference | Path Specifier | | BB Position (optional) |
|---|---|---|---|---|---|---|
| | | | | DIR | LEN | |
| 1 | 0xffff0 | 4 | 0 | 1010 | 4 | 6 |
| 1 | 0xfffa3 | 1 | 1 | 0010 | 4 | 8 |
| 1 | 0x00ff2 | 2 | 1 | 10 | 2 | 3 |
| 0 | ... | | | | | |

FIG. 6

METHOD AND APPARATUS FOR REORDERING MEMORY OPERATIONS ALONG MULTIPLE EXECUTION PATHS IN A PROCESSOR

BACKGROUND OF THE INVENTION

1. Field of the Invention

The present invention relates generally to computer processing systems and, in particular, to method and apparatus for reordering load operations along multiple execution paths in a computer program. The invention is applicable to operations reordered when the program is generated (static reordering) as well as to operations reordered at execution time (dynamic reordering).

2. Background Description

Contemporary high-performance processors rely on superscalar, superpipelining, and/or very long instruction word (VLIW) techniques for exploiting instruction-level parallelism in programs (i.e., for executing more than one instruction at a time). In general, these processors contain multiple functional units, execute a sequential stream of instructions, are able to fetch from memory more than one instruction per cycle, and are able to dispatch for execution more than one instruction per cycle subject to dependencies and availability of resources.

The pool of instructions from which the processor selects those that are dispatched at a given point in time is enlarged by the use of out-of-order execution. Out-of-order execution is a technique by which the operations in a sequential stream of instructions are reordered so that operations appearing later are executed earlier, if the resources required by the later appearing operations are free. Thus, out-of-order execution reduces the overall execution time of a program by exploiting the availability of the multiple functional units and using resources that would otherwise be idle. Reordering the execution of operations requires reordering the results produced by those operations, so that the functional behavior of the program is the same as what would be obtained if the instructions were executed in their original sequential order.

In the case of memory-related operations, a memory load operation reads a datum from memory, loads it in a processor register, and frequently starts a sequence of operations that depend on the datum loaded. Thus, in addition to using idle resources, the early (out-of-order) initiation of memory load operations may hide delays in accessing memory, including potential cache misses.

In general, there are two basic approaches to implementing out-of-order execution and reordering of results: dynamic reordering and static reordering. In dynamic reordering, the instructions are analyzed at execution time, and the instructions and results are reordered in hardware. In static reordering, a compiler/programmer analyzes and reorders the instructions and the results produced by those instructions when the program is generated, thus the reordering tasks are accomplished through software. These two approaches can be jointly implemented.

In current processor designs, instructions which can be executed out-of-order typically come from a single instruction stream which is usually the most likely path. The likeliness of a path can be determined by a number of methods, such as static or dynamic branch prediction, runtime profiling, or synthetically generated probabilities. Instructions from the most likely path are executed out-of-order and, if this path is taken, then the execution time of the path is reduced. However, if another, less likely path is taken, then no benefit is obtained by the out-of-order execution. In fact, the out-of-order execution of instructions on the predicted path may actually increase the runtime if the prediction is incorrect. This execution approach is referred to as a "single path" execution approach, since out-of-order execution occurs along a single predicted path which is deemed most likely.

Thus, effective out-of-order execution using the single path approach requires that the predictability of the most likely path be sufficiently high to generate any gains. Note that even though the predictability of a single branch may be deemed high, following the execution of several branches progressively degrades the probability that a given point on the path may be reached.

To reduce the risk of mispredicting the path and losing all of the gains from out-of-order execution, it is more advisable to make instructions from multiple paths available for execution. Various schemes and designs have been described to either statically or dynamically select instructions from multiple paths for out-of-order execution. These approaches are referred to as "multi path" approaches, since out-of-order execution occurs along multiple likely paths of execution.

Consider the following code fragment:

```
a[16]=0;
if (i<j)
    t=a[i]+1;
else
    t=a[j]+1;
```

In a single path approach, it has to be determined whether the condition i<j is more likely to be true or false over the whole execution of the program. When i<j is true, out-of-order execution and speculation may generate the following code:

```
t'=a[i]+1;
a[16]=0;
if (i<j)
    t=t';
else
    t=a[j]+1;
```

If a sufficient number of execution units are available, execution of this code may be improved for the expected path. However, if the alternate path is taken, no code improvements are achieved.

In a multipath scheme, instructions from both branches of the if statement can be moved out-of-order. This allows more aggressive code to be generated which will have good performance regardless of the branch direction (provided that enough execution units are available to execute the code from both branch paths without penalty):

```
t'=a[i]+1;
t"=a[j]+1;
a[16]=0;
if (i<j)
    t=t';
else
    t=t";
```

One factor that limits the ability to reorder operations is ambiguous memory references; this is the case when a memory load operation appears after a memory store operation in a sequential instruction stream, and it is not possible to determine ahead of time whether the memory locations accessed by the load and the store operations are different. For example, consider the following code fragment:

*X=(a+b+2)<<4 r=((*Y)+c)^d wherein:
* *X indicates the memory location whose address is contained in X;
* << indicates a left-shift operation; and
* ^ indicates an exclusive-or (XOR) operation.

Assuming that a, b, c, and d are values stored in registers r1 through r4 of a processor, respectively, and that X and Y are in registers r8 and r9, respectively, then this code fragment can be represented by the following instruction sequence (wherein the first register after the name of the instruction is the target register, and the remaining registers are the input operands):

```
add         r10,r1,r2        ; r10 = a+b
add         r11,r10,2        ; r11 = a+b+2
shift_left  r12,r11,4        ; r12 = a+b+2<<4
store       r12,(r8)         ; *X = a+b+2<<4
load        r20,(r9)         ; r20 = *Y
add         r21,r20,r3       ; r21 = *Y+c
xor         r22,r21,r4       ; r22 = (*Y+c) ^d
```

If it can be determined that X and Y are different, then the two expressions can be scheduled for parallel execution, yielding a sequence as follows (wherein the symbol ∥ denotes parallel execution):

```
add          r10, r1, r2 ∥     load r20, (r9)
add          r11, r10, 2
shift_right  r12, r11, 4 ∥     add r21, r20, r3
Store        r12, (r8) ∥       xor r22, r21, r4
```

In a machine with two execution units, the above sequence would take 4 cycles to complete (assuming that a load takes two cycles, and other operations take a single cycle).

On the other hand, if it cannot be determined whether X and Y are always different, i.e., the addresses are ambiguous, then the two expressions would have to be scheduled in the original order, taking 8 cycles (assuming again that a load takes two cycles).

The above example is not atypical. Ambiguity in memory references degrades performance fairly severely by forcing the sequential execution of operations that could otherwise be executed in parallel. However, such a serialization can be avoided (that is, the load operation can be performed earlier than the store operation) as long as the datum loaded out-of-order is the same as the value that would have been loaded after the store operation. Thus, the load operation performed earlier than the store operation is valid as long as the datum loaded out-of-order is coherent with the corresponding datum in memory (i.e., has the same value) at the original point of the load operation in the instruction stream (the in-order point). Moreover, if these values are coherent, any operation that depends on the datum loaded out-of-order can also be performed out-of-order. On the other hand, if the values are not coherent, then the datum loaded out-of-order and any results derived from it are invalid, making it necessary to re-execute the load operation at the in-order point, as well as the associated dependent operations.

Various attempts have been made towards solving the problem of reordering memory operations with ambiguous references by processors. These schemes assume that instructions are reordered from a single path only and are generally not applicable to out-of-order execution along multiple paths.

While the prior art has dealt with detecting interference between memory references along a single path, these inventions are generally not applicable for execution along multiple paths. To allow efficient out-of-order execution along multiple paths, only the interference along the eventually taken path should be reported and resolved.

Consider the following example, with values of i=16 and j=15.

```
1       t' = a[i] + 1;
2       t" = a[j] +1;
3       a[16] = 0;
4       if  ( i < j )
5           t = t';
6       else
7           t = t";
```

The sequence of executed instructions for the values of i=16 and j=15 is then 1, 2, 3, 4, 7. Although interference exists between instructions 1 and 3, no action has to be taken since the value computed for t' is computed speculatively for the case wherein execution reaches line 5. However, since execution never reaches line 5, no corrective action is required.

The situation is different for values of i=16 and j=17, when the set of executed instructions is then 1, 2, 3, 4, 5. The interference between instructions 1 and 3 has to be corrected, since the speculatively computed result by instruction 1 does contribute to the actual computation of the program.

A summary of relevant art dealing with asynchronous memory operations in a multiprocessor environment that implements reordering of memory load operations along multiple paths of execution will now be given.

Current architectures which speculate along a single path of execution maintain a buffer of stores waiting to be written into the memory system. When a subsequent load occurs, its address is first compared to the entries in the store buffer (from newest to oldest) and, if a match occurs, then the value for the load is forwarded to the appropriate destination (instead of being fetched from cache or main memory). This method is inadequate when loads may be speculatively executed prior to stores, even if only a single path of execution is followed. To handle such speculative loads, a mechanism is needed when a store is reached to detect when a previous speculative load has (incorrectly) read data from the same location now being updated by the store. This check is typically accomplished by maintaining a content addressable memory (CAM) of speculative load addresses, and comparing all addresses therein when a store is reached. However, this scheme is still inadequate when loads from multiple paths may be speculated.

For example, consider a load operation from a path A that is speculatively executed prior to the conditional branch which precedes the load. Then assume that during execution of the program, path A is not executed, i.e., the conditional branch goes the other way to a path B. Further, assume that path B has a store operation which writes to the same address as the speculative load from path A. The machine does not know that there is no real conflict between the speculative load and the store. It also does not know that the load CAM can discard the entry for this speculative load. The present invention described hereinbelow overcomes both of these problems.

In U.S. Ser. No 08/829,669, now U.S. Pat. No. 5,931,957, entitled "Support for Out-of-order Execution of Loads and Stores in a Processor", filed on Mar. 31, 1997, assigned to the assignee herein, and incorporated herein by reference, a mechanism is disclosed for executing along a single predicted path. The mechanism is based on reorder buffers for out-of-order execution of load operations with respect to other load operations and store operations. As soon as interference is detected, the out-of-order instruction and all subsequent operations are flushed and out-of-order execution restarts. This approach is overly aggressive for execution along multiple paths, where interference along one, potentially untaken path, could result in the flushing of operations along another, possibly taken, path.

Several designs have been proposed for executing along multiple execution paths, but none of the designs address the issue of memory consistency or efficiently detect interference between reordered instructions when speculating along multiple paths. An architecture for executing instructions along multiple paths is described by Klauser et al., in "Selective Eager Execution on the Polypath Architecture", 25th Annual International Symposium on Computer Architecture, pp. 250–59 (1998). This architecture uses "context tags" to identify paths and tag data in store buffers. This information is used to selectively forward data from store buffers to load instructions. However, this architecture does not deal with detecting interference when load instructions are moved speculatively over store operations.

A VLIW processor for implementing the PowerPC architecture using binary translation is described by K. Ebcioglu, J. Fritts, S. Kosonocky, M. Gschwind, E. Altman, K. Kailas, and T. Bright, in "An Eight-Issue Tree-VLIW Processor for Dynamic Binary Translation", International Conference on Computer Design (October 1998). The VLIW processor uses load data verification to speculate load operations along multiple paths, and detect interference. Whereas the load operation is performed out-of-order, the load verify instruction is executed in-order (and only if control reaches a given path). As a result, interference will only be detected and repaired for the taken path, i.e., those load operations which influence the correct execution of the program.

This interference detection mechanism based on load data verification is described in U.S. Pat. No. 5,758,051, entitled "Method and Apparatus for Reordering Memory Operations in a Processor", issued on May 26, 1998, assigned to the assignee herein, and incorporated herein by reference. In this approach, data items accessed by an out-of-order load operation are read in-order, and the result of the in-order load operation is compared to the out-of-order result. If the two values are identical, then no detectable interference has occurred and the program continues execution. On the other hand, if the items are dissimilar, then the value returned by the in-order load operation is used to re-execute all dependent instructions. Note that for interference detection based on load verification, if interference cannot be detected, then it is presumed that no interference exists. This approach reduces the amount of hardware necessary to monitor interference and the number of re-executions, but requires additional bandwidth to perform a second in-order load for every load moved out-of-order.

3. Problems with State of the Art

The invention disclosed in the above referenced patent application Ser. No. 08/829,669 successfully addresses speculation along a single path by using re-order buffers, without incurring a cost in the form of additional memory subsystem accesses. However, the approach described therein is too zealous in restarting when performing out-of-order execution along multiple paths. As a result, interference may be detected and reported erroneously, either if (1) real interference exists along an execution path which is not taken, or (2) interference between instructions two disjoint paths may be reported if the processor supports speculative execution of store operations along multiple paths.

While interference testing based on load-verification allows accurate detection of interference in the presence of speculation along multiple paths, it does so at the cost of significantly increased memory bandwidth requirements.

Thus, it would be desirable and highly advantageous to have a method and apparatus for keeping track of ambiguities along each path and initiating re-execution of an ambiguous load operation along the actually executed path when that path has been determined.

SUMMARY OF THE INVENTION

The present invention is directed to a method and apparatus for reordering memory operations along multiple execution paths in a processor. The present invention utilizes path information to perform out-of-order execution and speculation along multiple probable execution paths. Interference information is maintained to ensure correct operation of the memory system without reporting spurious interference conflicts (of the type described above with respect to the prior art).

According to one aspect of the present invention, there is provided a method for scheduling instructions for execution along multiple paths in a computer processing system implementing out-of-order execution. The method includes the step of selecting and moving a next instruction from its current position in a sequence of instructions to an earlier position. It is determined whether the selected instruction may reference a memory location for read-access. It is determined whether the selected instruction was previously moved over a non-selected instruction which may ambiguously reference the memory location, when the selected instruction may reference the memory location for read-access. It is determined whether the selected instruction was previously moved over a branch instruction, when the selected instruction was previously moved over the non-selected instruction. A record of the selected instruction is stored for future reference, when the selected instruction was previously moved over the branch instruction. The record includes a path specifier for indicating a path from a current locus of execution to a basic block corresponding to a in-order position of the selected instruction.

According to another aspect of the present invention, there is provided a method for checking for interference between a current memory operation and previously executed load instructions in a computer processing system implementing out-of-order execution along multiple paths. The method includes the step of storing in a table a plurality of entries, wherein each given entry corresponds to a given speculative operation and comprises an address field for storing a memory address corresponding to the given speculative load operation, and an interference field for indicating whether the given speculative operation has been interfered with. It is determined whether a current entry in the table refers to a speculative load operation in a current basic block. It is determined whether a first interference exists between the memory address stored in the address field of the current entry and the current memory operation, when the current entry refers to the speculative load operation in the current basic block. Re-execution of the speculative load operation is initiated, when the first interference exists. It is determined whether a second interference exists between the current memory operation and the speculative load operation, when the current entry does not refer to the load operation, the speculative load operation having been moved over at least one branch and the current memory operation. The second interference is recorded in the interference field of the current entry, when the second interference exists.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

The present invention is directed to a method and apparatus for reordering memory operations along multiple execution paths in a processor. In such a computer processing system sequences of instructions are stored in a memory for execution by at least one processor unit. The invention is applicable to operations reordered when the program is generated (static reordering) as well as to operations reordered at execution time (dynamic reordering). Further, the invention is suitable for software and/or hardware based implementations and, is applicable in uniprocessor and multiprocessor systems.

To facilitate a clear understanding of the present invention, definitions of terms employed herein will now be given. A load instruction refers to any instruction performing a memory read-access and (optionally) computations based on the loaded value. Thus, a load instruction may include, for example, logic, arithmetic and other instructions which employ data from memory locations as operands. Out-of-order execution is a technique by which the operations in a sequential stream of instructions are reordered so that operations appearing later are executed earlier, if the resources required by the later appearing operations are free. Thus, an out-of-order load instruction may be created, either statically or dynamically, by moving a load instruction from its original position in a sequence of instructions to an earlier position in the sequence of instructions. Such out-of-order load instruction identifies a location in memory from which to read a datum, and a first destination register in which to place the datum. An ambiguous memory reference refers to the case when a memory load operation appears after another memory load operation in a sequential instruction stream, and it is not possible to determine ahead of time whether the memory locations to be accessed by the two memory load operations are different. A speculative operation is an out-of-order operation that may not necessarily be executed because, for example, the execution path in which it is located may not be followed but rather, another execution path may be followed instead. A basic block is a sequence of instructions that is entered at the first instruction of the sequence and is only exited at the last instruction of the sequence.

The following description and corresponding examples will be given based on two instructions (unless otherwise noted), a first instruction which is executed out-of-order before a second, logically preceding instruction, which will be termed an in-order instruction. Thus, unless otherwise noted, the designation 'in-order', refers only to the sequential relationship between the logically preceding in-order instruction and the first 'out-of-order' instruction. However, it is to be appreciated that the invention can be easily extended to cover multiple out-of-order and in-order load operations by anyone skilled in the art. It is to be noted that the above two instructions (i.e., both the in-order and the out-of-order load instructions) may be in-order or out-of-order with respect to a third instruction (and so forth).

A description of a multipath load order table, which may be employed in various aspects of the present invention, will now be given. It is to be appreciated that the following description of the multipath load order table corresponds to an exemplary embodiment of the present invention. Accordingly, one skilled in the art may readily modify the described multipath load order table depending on the particular implementation.

Figure 6:
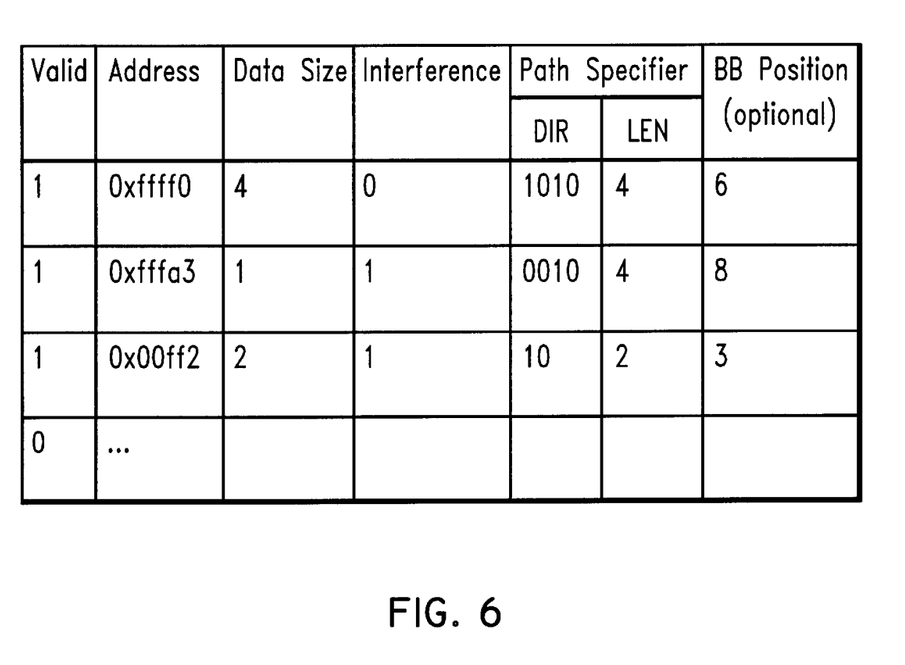
FIG. 6 is a diagram illustrating the various fields of a multipath load order table according to an exemplary embodiment of the present invention.

The multipath load order table includes a plurality of entries. According to the exemplary embodiment, each entry includes a valid field, an address field, a data size field, an interference field, a path specifier, and a basic block (BB) position field. FIG. 6 is a diagram illustrating the various fields of a multipath load order table according to an exemplary embodiment of the present invention.

The valid field indicates whether this entry is currently in use. The address field includes a record of the data address corresponding to a speculative (out-of-order) load operation. Depending on the implementation, the address included in the address field may be an effective address, a virtual address, a physical address, and so forth. The data size field includes a record of the size of the speculative access which was performed.

The interference field includes an interference bit which indicates whether a store operation has been detected as interfering with the out-of-order load operation. The interference bit is initially set to false when an out-of-order load operation is entered into the multipath load order table, and is set during the execution of an in-order store operation when interference with a store operation is detected.

The path specifier field records the path from the current locus of execution to the basic block corresponding to the in-order position of the out-of-order load operation. In the exemplary embodiment, the path specifier is shown to consist of two parts. The first part, LEN, indicates the number of branches over which the instruction has been moved out-of-order. The second part, DIR, indicates the direction these branches have to take to reach that basic block. For example, with respect to FIG. 6, the out-of-order load operation which read from address 0xffff0 has been moved across four branches. For the out-of-order instruction to be on-path, the first branch of the four branches has to be taken, the second branch ha s to be not taken, the third branch has to be taken, and the fourth branch has to be not taken.

The path specifier is created and entered into the table when the out-of-order load instruction is executed. The path specifier is tested and updated by successive branch instructions. For example, if the first branch instruction is taken, the entry for the out-of-order load instruction from address 0xffff0 will be tested and updated in accordance with the process of FIG. 4. The path specifier is updated to DIR "010" and LEN 3. On the other hand, when a first taken branch instruction is encountered, the entry corresponding to the out-of-order load from address 0fffa3 will be deleted (e.g., by setting its VALID bit to "0") because it is no longer on-path.

The ba sic block position field is used in the detection of interference at the basic block level. In the exemplary embodiment, this field indicates the instruction sequence number of the out-of-order load instruction within its original basic block. This information is optional, and disambiguation within a basic block can be performed independently of the current invention together with disambiguation along multiple paths according to the present invention .

The following mechanisms operate on the multipath load order table:
A. Entries are inserted when a load instruction is moved out-of-order with respect to at least one branch instruction and one ambiguous memory operation.
B. The address of each entry describing an out-of-order access is compared to the addresses of all memory operations which are in-order with respect to the out-of-order load instruction to determine whether interference has occurred. If interference has occurred, then it so indicated in the table (see FIG. 3 and accompanying text hereinbelow).
C. On every branch instruction, it is determined for every entry whether it is on-path or off-path.
Entries which describe off-path load instructions are discarded (e.g., by clearing their valid bit). If an instruction is on-path, the path specifier is updated to reflect the processing of the current branch (see FIG. 4 and accompanying text hereinbelow).
D. When an out-of-order instruction is no longer out-of-order with respect to any branches, the entry is discarded. This can occur during the processing of the branch to the basic block of the in-order location of the original load operation, or at the in-order point of the load instruction.

The multipath load order table can be organized for fully associative access, or for set-associative or direct-mapped access based on the memory addresses (or some other criterion to define equivalence classes, e.g., the target register of a load instruction).

When a memory load instruction is a candidate for out-of-order execution, a new entry is allocated for it. If the multipath load order table is full and no further entries can be allocated, then load instructions can no longer executed out-of-order until an entry becomes available. The multipath load order table is described in further detail hereinbelow.

Figure 1:
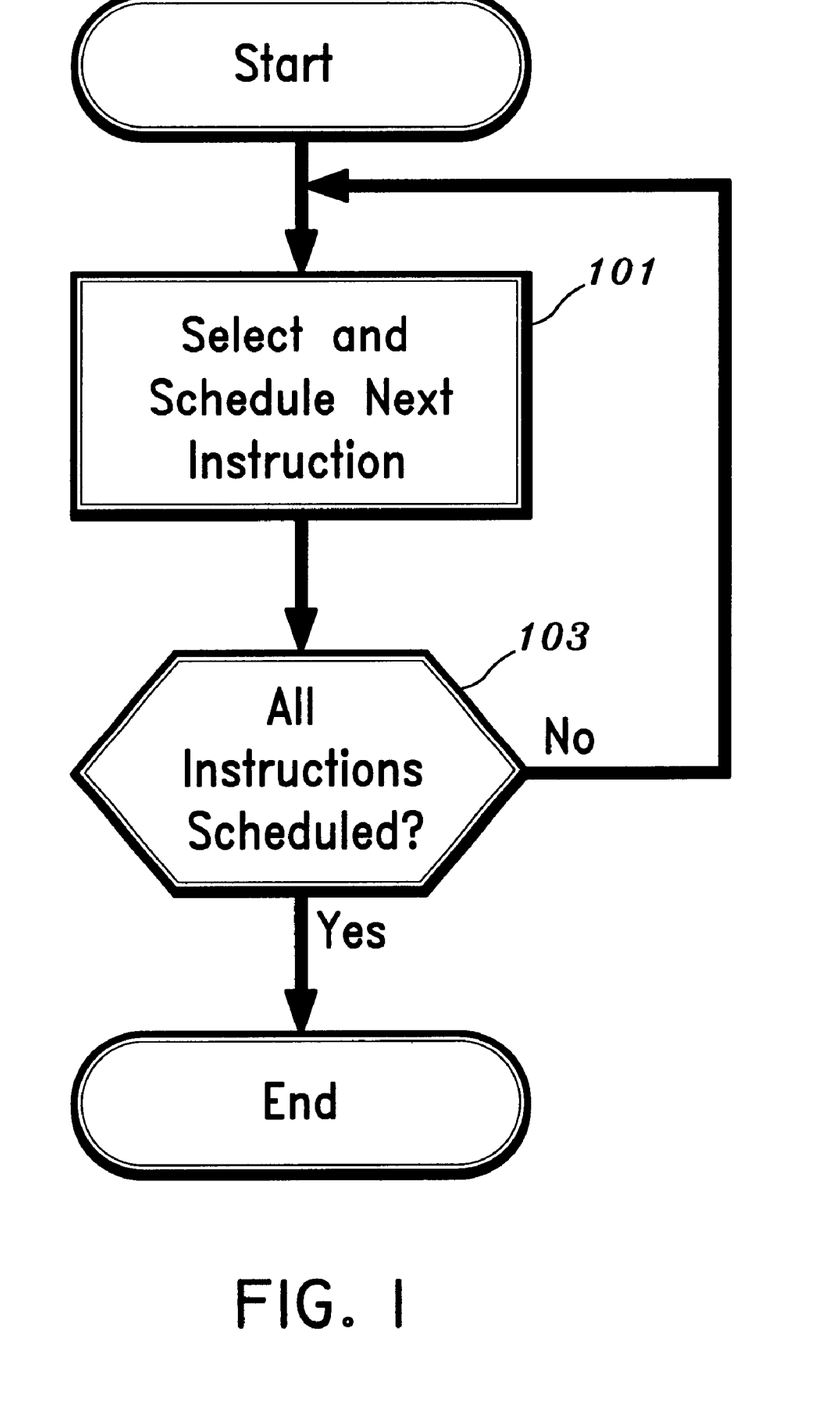
FIG. 1 is a flow diagram illustrating the scheduling of instructions according to the prior art, when reordering of operations other than memory operations is performed either statically or dynamically.

FIG. 1 is a flow diagram illustrating the scheduling of instructions according to the prior art, when reordering of operations other than memory operations is performed either statically or dynamically. Reordering is performed according to the method of FIG. 1 only if such reordering is not subject to ambiguities.

In step 101, the next instruction is selected and moved from its current position in the sequential stream of instructions to an earlier position (i.e., the instruction is "scheduled" for execution), if such a movement is advantageous and does not affect the proper operation of the program. That is, the selected instruction is moved to an earlier position if the instruction does not depend on any of the instructions over which it is moved.

In step 103, it is determined whether there are instructions left to be scheduled. If so, then the process returns to step 101. Otherwise, the process terminates.

Figure 2:
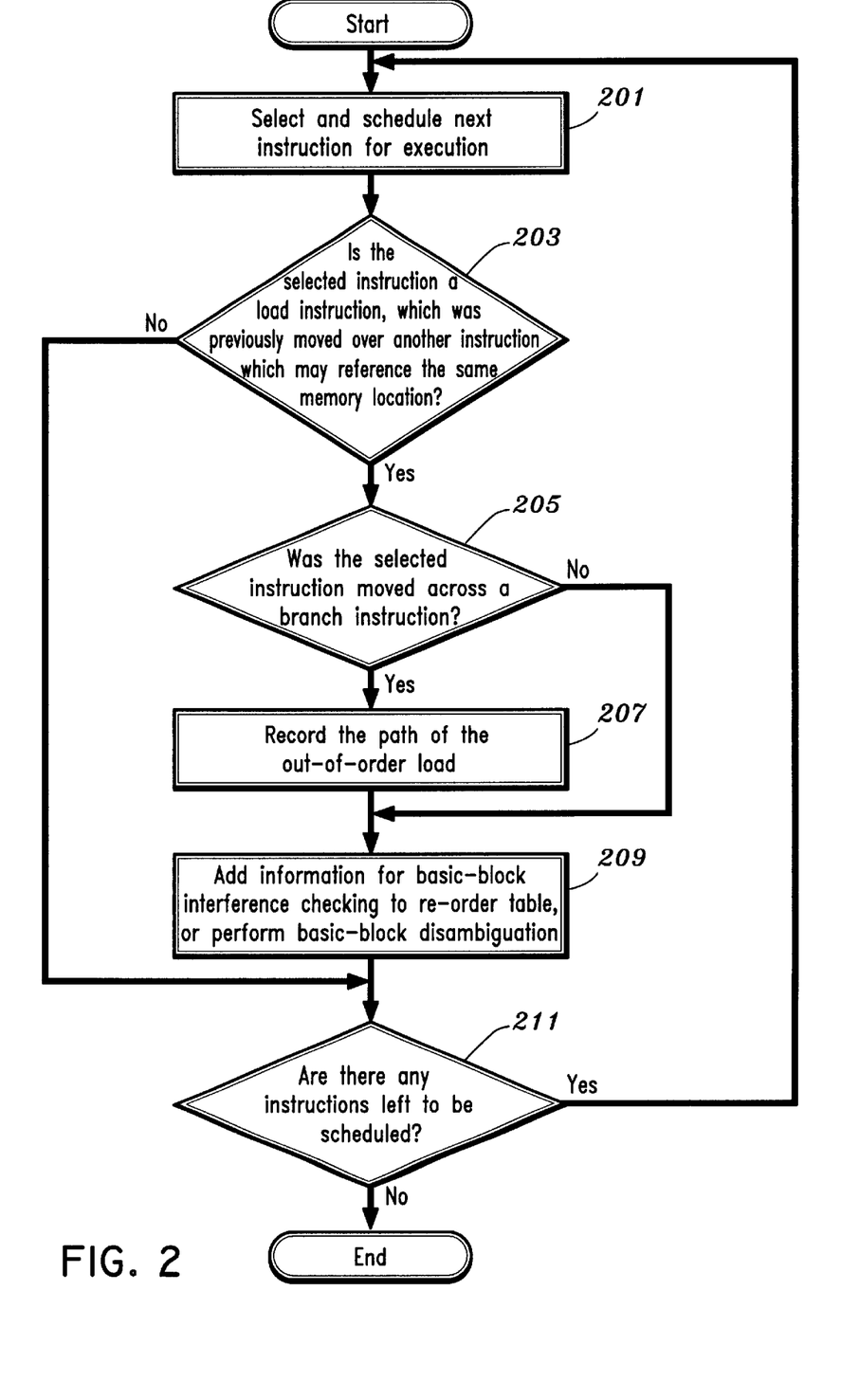
FIG. 2 is a flow diagram illustrating a process for reordering operations in a computer processing system from an original sequence of instructions, according to an embodiment of the present invention.

FIG. 2 is a flow diagram illustrating a process for reordering operations in a computer processing system from an original sequence of instructions, according to an embodiment of the present invention. In particular, FIG. 2A depicts how any scheduling technique can be extended to handle disambiguation according to the present invention. Note that this general scheme is applicable to all techniques that implement disambiguation (i.e., either static or dynamic). The computer processing system on which the process of FIG. 2 is employed includes a multipath load order table. In the embodiment of FIG. 2, the multipath load order table contains at least a path specifier field as described herein.

In step 201, the next instruction is selected and scheduled for execution. This can include moving the instruction out-of-order from its current position in the sequential stream of instructions to an earlier position.

In step 203, it is determined whether the selected instruction was a load (or any other instruction which may reference a memory location for read access). If so, it is further determined in step 203 whether the selected instruction was previously moved over another non-selected instruction which may ambiguously reference the same memory location. The two determinations made in step 203 may also be characterized as whether the selected instruction is an out-of-order load instruction with respect to one or more in-order instructions. If either of the results of the two determinations made in step 203 is false, then the process continues to step 211. However, if it was determined in step 203 that the selected instruction was a load instruction (or any other instruction which may reference a memory location for read access) and further, that the selected instruction was previously moved over a non-selected instruction which may ambiguously reference the same memory location, then the process continues to step 205.

In step 205, it is determined whether the selected instruction was moved over a conditional branch instruction or any other instruction causing a control (instruction) flow split. If the selected instruction was not moved over a conditional branch instruction or any other instruction causing a control flow split (i.e., if the selected instruction is in-order with respect to all branch operations), then the process continues to step 209. Otherwise, the process continues to step 207.

In step 207, a record of the selected instruction is stored in the multipath load order table for future reference (by, for example, a branch instruction or an in-order place-holder of the load operation). The record includes the path of the selected instruction. The path is indicated using a path specifier. As described above, a path specifier consists of two parts. The first part corresponds to the number of branch decisions (LEN), and the second part corresponds to the direction (DIR) of each branch decision.

It is assumed herein that paths are encoded using two distinct data fields for the branch decision sequence (DIR) and path depth (LEN). However, other encodings may be used while maintaining the spirit and scope of the present invention. Possible encodings for a path specifier can either explicitly specify each part separately, or in a single representation. Examples of such encodings are the "context tags" described by Klauser et al., in the above referenced article entitled "Selective Eager Execution on the Polypath Architecture", or adaptive branch trees. Adaptive branch trees are described by T. F. Chen, in "Supporting Highly Speculative Execution via Adaptive Branch Tree", Fourth International Symposium on High-Performance Computer Architecture, pp. 185–94 (1998).

Step 209 is an optional step. In step 209, additional information for basic-block interference checking may be added to the multipath load order table, or other operations for performing basic-block level disambiguation may be performed.

In step 211, it is determined whether there are instructions left to be scheduled. If go, the process returns to step 201. Otherwise, the process terminates.

Figure 3:
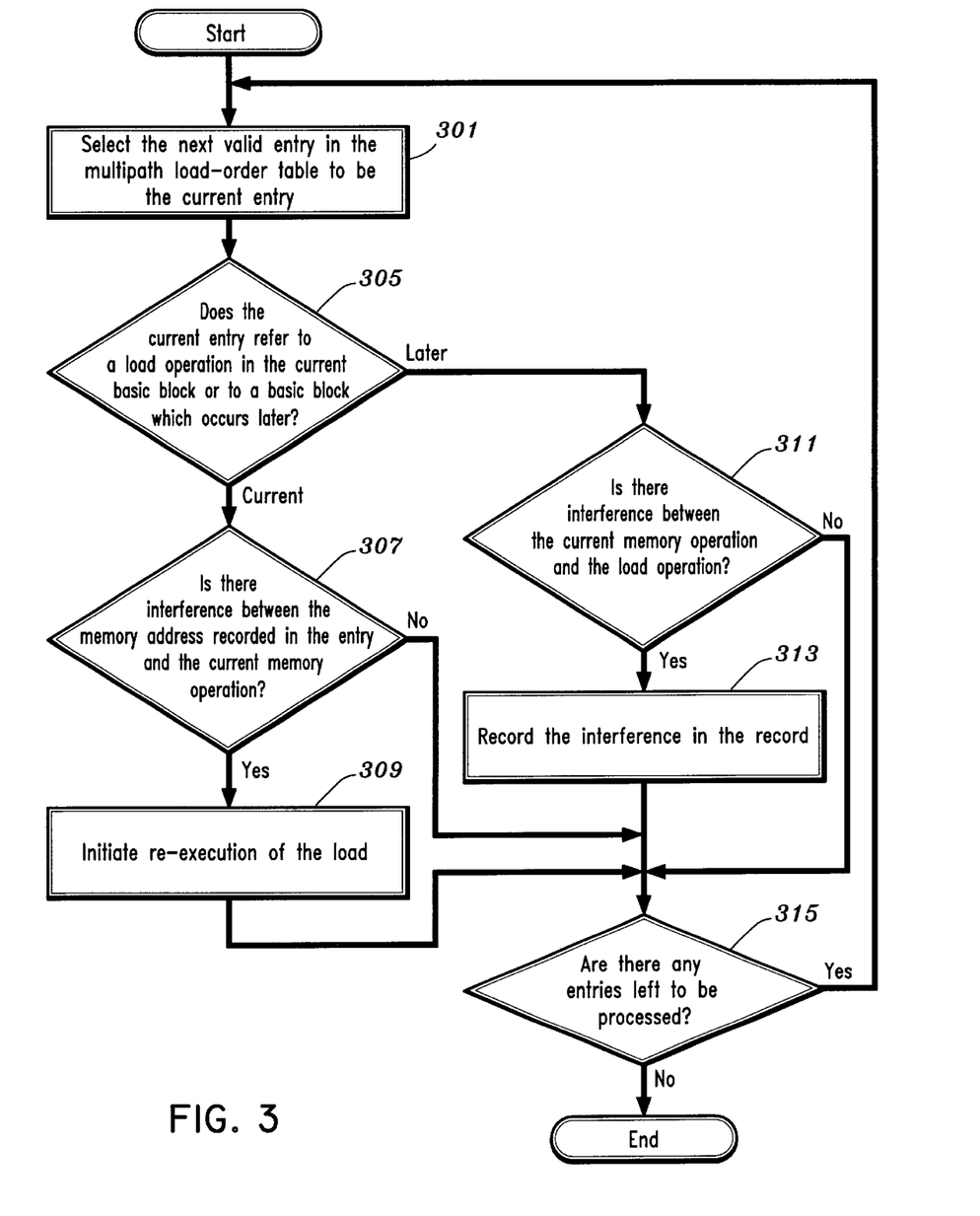
FIG. 3 is a flow diagram of a method for checking for interference between a current memory operation and previously executed load instructions in a computer processing system implementing out-of-order execution along multiple paths.

FIG. 3 is a flow diagram of a method for checking for interference between a current memory operation and previously executed load instructions in a computer processing system implementing out-of-order execution along multiple paths. The steps of FIG. 3 are to be performed at execution time. It is to be appreciated that there are several different setups which may be used to implement the process of FIG. 3. For example, the steps may be performed with respect to only local stores for uniprocessors, to both local and snooped remote stores for multiprocessors, or for local loads (over which another load operation has been moved) and stores for multiprocessors. It can determined whether another load operation has been moved over a local load by comparing the path specifiers for the two instructions. It is to be further appreciated that other combinations may be used to implement various other memory coherence schemes, while still maintaining the spirit and scope of the present invention. Such other combinations are readily ascertainable to those skilled in the relevant art.

The method of FIG. 3 assumes that a multipath load order table has been maintained for a plurality of entries corresponding to speculative memory (e.g., load) operations, wherein each entry includes, at the least, an address field for storing a memory address corresponding to the given speculative load operation, and an interference field for indicating whether the given speculative operation has been interfered with.

In step 301, the next valid entry in the multipath load order table is selected as the current entry. In step 305, it is determined whether the current entry refers to a speculative load operation in a current basic block, or to another speculative load operation in a basic block which occurs later along one of the possible execution paths. In a preferred embodiment of the present invention, this determination can be performed by testing the branch level (i.e., the LEN portion of the path specifier). A LEN value of 0 implies the current basic block.

If the current entry refers to a speculative load operation in the current basic block, then processing continues to step 307. On the other hand, if the current entry refers to a speculative load operation in a basic block which occurs later, then the process continues to step 311.

In step 307, it is determined whether there is interference between the memory address stored in the address field of the current entry and the current memory operation. If there is no interference, then the process continues to step 315. On the other hand, if there is interference, then the process continue s to step 309.

In step 309, re-execution of the speculative load operation is initiated, and the method then proceeds to step 315. In a preferred embodiment of the present invention, speculative results at this point are discarded, and execution is set to resume at the instruction immediately following the current memory operation. By discarding such speculative results, no time is wasted computing values derived from the incorrect load.

In step 311, it is determined whether there is interference between the current memory operation and the other speculative load operation in the later basic block, the other speculative load operation having been moved over one or more branches and the current memory operation. If there is no interference, then the process continues to step 315. On the other hand, if there is interference, then the interference is recorded in the record (step 313), with processing continuing uninterrupted. Since the speculative load operation has been moved over a control flow split, it may be possible that such operation will never actually be reached, thereby obviating the need to resolve an interference condition.

In a preferred embodiment of the present invention, at this point, the processor can discontinue speculating along the path where interference has been detected. In another preferred embodiment of the present invention, the processor can selectively flush the load operations which have been interfered with as well as all successor operations along the path of the offending load ONLY, and selectively restart instruction fetch for that path at the location of the load instruction.

In step 315, it is determined whether there are additional entries to be processed. If there are no additional entries to be processed, then the process terminate. On the other hand, if there are additional entries to be processed, then the process returns to step 301 to select the next valid entry. In a preferred embodiment of the present invention, all table entries are operated upon simultaneously.

With respect to step 309, in some cases, better performance may result from waiting until the point of problem load in the original unrescheduled code. This could happen, for example, if many long latency speculative operations with values independent of the problem load were started many cycles previous to this point. In such a case, performance would be better if these values did not have to be recomputed after execution is restarted. The present invention works with either of these embodiments, and similar variations obvious to those skilled in the art.

Figure 4:
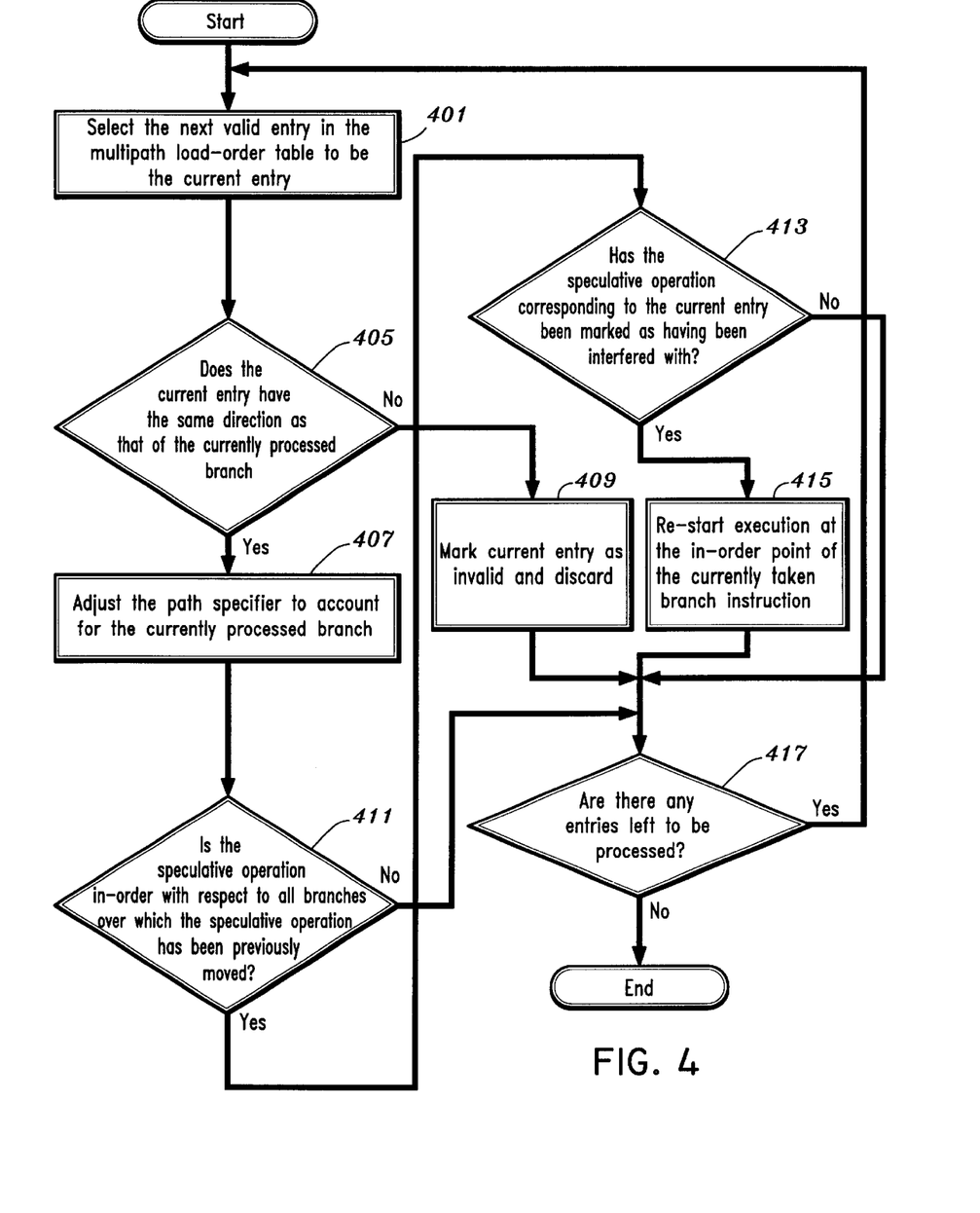
FIG. 4 is a flow diagram of a method for executing branch instructions in a computer processing system implementing out-of-order execution along multiple paths.

FIG. 4 is a flow diagram of a method for executing branch instructions in a computer processing system implementing out-of-order execution along multiple paths. The branch instructions are in-order with respect to an out-of-order memory operation.

The method of FIG. 4 assumes that a multipath load order table has been maintained for a plurality of entries corresponding to speculative memory (e.g., load) operations, wherein each entry includes, at the least, a path specifier field for storing a path from a current locus of execution to a basic block associated with an in-order position of the given speculative operation, and an interference field for indicating whether the given speculative operation has been interfered with.

In step 401, the next valid entry is selected as a current entry for processing. In step 405, it is determined whether the first branch encoded in the path specifier of the current entry has the same direction as that of the branch being currently processed. The determination made in step 405 may also be characterized as whether the out-of-order load to which the current entry refers is on-path. The determination is made by comparing the direction of the current branch with the path specifier in the entry. If the current entry is on-path, then the process continues to step 407. On the other hand, if the current entry is not on-path (i.e., it is off-path), then the process continues to step 409.

In step 409, the current (off-path) entry is marked invalid and discarded. It is immaterial whether such entry ever recorded an interference. This completes the processing of the current entry and thus, the process continues to step 417.

In step 407, the path specifier of the current entry is adjusted to reflect the new locus of execution to the basic block containing the in-order position of the speculative operation. In a preferred embodiment of the present invention, adjustment of the path specifier includes shifting the branch direction string (DIR) to the left by one and reducing the number of branch levels in the branch level field (LEN). In another preferred embodiment of the present invention, both the branch decision string (DIR) and the branch levels (LEN) are represented as bit strings which are shifted to the left.

In step 411, it is determined whether the speculative memory operation is now in-order with respect to all branches over which the speculative memory operation has been previously moved. If so, then the process continues to step 413. Otherwise, the process continues with step 417.

In step 413, it is determined whether the speculative operation has been marked as having been interfered with. If the speculative instruction has not been marked as having been interfered with, then the process continues to step 417. On the other hand, if the speculative instruction has been marked as having been interfered with, then the process continues to step 415.

In step 415, execution is restarted at the in-order point of the current branch instruction. This ensures the re-execution of the out-of-order load operation with the correct in-order data value.

In embodiments of the present invention based on static code generations, a transfer is made to "fix-up" code, which re-executes the offending load operation and all operations dependent therefrom. The fix-up code can be generated in a variety of ways, such as, for example, statically at program generation, dynamically from the out-of-order code, or from a copy of the original in-order code when a violation has been detected.

In step 417, it is determined whether any more entries remain. If so, then the process returns to step 401 to select the next valid entry.

In a preferred embodiment of the present invention, all entries are operated upon in parallel. In addition, one or more of the operations described here may be executed in parallel or reverse order. Appropriate selection of the data formats used to represent the fields operated on can significantly impact the efficiency of the described operations. These and similar optimizations are obvious to those skilled in the art.

EMBODIMENT USING STATIC SCHEDULING AND INSTRUCTIONS FOR THE INTERFERENCE TEST

In order to illustrate possible implementations of the interference test of the present invention using static scheduling and instructions, examples are provided hereinbelow wherein the desired functionality of the interference test is implemented at the word level. However, it is to be appreciated that processors which implement memory read operations at the bit, byte, half-word or any other level can also be adapted to use the methods described herein.

The examples provided herein utilize the following notation:

RT, PA, and RB identify general purpose registers;

(RT), (RA), (RB) refer to the contents of general-purpose registers RT, RA, and RB, respectively;

The functions TLB( ) and MEM( ) represent accesses to the translation lookaside buffer and to main storage, respectively.

In a static embodiment, the code is re-ordered by software. The software can perform this re-ordering either at compile time, or at the run time of the program. The re-ordering can also include steps directed to translating from one instruction set architecture to another instruction set architecture.

To implement this scheme in an architecture with static (i.e., compiler-based) re-ordering, a multipath load order buffer is added to the processor. The multipath load order buffer is used in conjunction with the following mechanisms:

A. A first mechanism for entering information about out-of-order load instructions into the multipath load order buffer with a path specifier describing the original position of the load operation;

B. A second mechanism for performing interference testing between the entries in the multipath load order buffer and any in-order memory operations;

C. A third mechanism for removing entries from the multipath load order buffer which are off-path with respect to a resolved branch;

D. A fourth mechanism for restarting execution in-order when an out-of-order instruction which is on-path has been interfered with.

The first mechanism A is preferably implemented by a new load instruction hereinafter referred to as "load speculatively" which indicates its original position using a path specifier as an additional parameter. When this instruction is executed, it enters the address of the access and the path specifier into the multipath load order buffer. Optionally, the instruction can be extended to add information for basic-block level interference checking (possibly by introducing one or more additional parameters). Alternative implementations may use one or more new or existing instructions to implement this mechanism in any combination of software and hardware.

The second mechanism B is preferably added to memory operations. The memory operations to which the second mechanism may be added include only the store operations for a uniprocessor, local and remote store operations for multiprocessors, or local load and store operations for multiprocessors. Alternative implementations may use one or more new or existing instructions to implement this mechanism in any combination of software and hardware.

The third mechanism C is preferably added to branch operations. Alternative implementations may use one or more new or existing instructions to implement this mechanism in any combination of software and hardware.

Depending on the system, the fourth mechanism D can be implemented in at least any one of the three ways described hereinbelow. In the first way, the fourth mechanism is implemented in the branch operations and executed when an entry is detected which: (i) has been interfered with; (ii) is on-path; and (iii) is no longer out-of-order with respect to any branch operations. The fourth mechanism D can also be implemented entirely in hardware in the original location of the load operation, or by an instruction which has been placed at the in-order point of the load operation. Yet another implementation may defer invocation until a later point in the program, e.g., to the first memory operation following the in-order point of the load operation, or the first branch operation following such point, or any other point which maintains the spirit and scope of the present invention.

The load speculatively instruction is executed as follows:

```
lwzx.s RT, RA, RB, PS
    EA <= (RA) + (RB)        # EA = Effective Address
                               (or Virtual Address)
    PA <= TLB(EA)            # PA = Physical Address
                               (or Real Address)
    RT <= MEM(PA,4)
    ENTER_MULTIPATH_LOAD_ORDER_TABLE
    (PA, PS, success) # PS = Path
                                Specifier
```

EA is the memory address referenced by the instruction. A word (4 bytes) is read starting from address EA and stored in target register RT. The address is then entered into the memory-order buffer, together with the path specifier PS.

The load speculatively operation can also record the success of an operation in the multipath load order table to implement fault handling for speculative load instructions.

While memory access has been described herein in terms of memory words consisting of 4 bytes, it will obvious to anybody skilled in the art how this can be applied to other data word sizes. Furthermore, alternate implementations may enter other presentations of the memory address (such as effective, or virtual address) instead of storing a physical address.

In certain embodiments, special care has to be taken to ensure correct operation on context switches so that only multipath load order table entries of the current process are processed when a branch is processed, but all entries are compared for address overlap if multiple processes can refer to shared memory locations.

Consider the previous example, which can be translated to PowerPC machine code as follows:

```
        cmpw         cr1, r3, r4
        li           r6, 0
        stw          r6, 64 (r5)
        bge          cr1, L2
        slwi         r9, r3, 2
        lwzx         r6, r9, r5
        addi         r3, r6, 1
        blr
L2:
        slwi         r9, r4, 2
        lwzx         r6, r9, r5
        addi         r3, r6, 1
        blr
LT . . tst:
```

A statically re-ordered program employing the present invention could move both load operations over the conditional branch and execute them with a load speculatively operation. In addition, dependent operations can be moved over the load operation:

```
        slwi         r11, r3, 2
        slwi         r9, r4, 2
        lwzx.s       r11, r11, r5, <not taken>
        lwzx.s       r9, r9, r5, <taken>
```

```
        addi         r11, r11, 1
        addi         r9, r9, 1
        li           r6, 0
        stw          r6, 64 (r5)
        cmpw         cr1, r3, r4
        bge          cr1, L5
        mr           r3, r11
        blr
L5:
        mr           r3, r9
        blr
```

In this example, the path specifier for both load speculatively operations contains the direction for a single branch, but load operations can also be speculated over multiple branches with the present invention.

EMBODIMENT USING DYNAMIC SCHEDULING AND HARDWARE RESOURCES FOR THE INTERFERENCE TEST

An implementation of a processor capable of dynamically scheduling instructions along multiple paths (a multipath out-of-order issue processor) includes the following features:

1. A first mechanism to fetch instructions along multiple paths;
2. A second mechanism for issuing instructions out-of-order, including the ability to detect dependencies among the instructions, rename the registers used by an instruction, and detect the availability of the resources used by an instruction;
3. A third mechanism for maintaining the out-of-order state of the processor, which reflects the effects of instructions as they are executed (out-of-order);
4. A fourth mechanism for retiring instructions in program order, simultaneously updating the in-order state with the effects of the instruction being retired;
5. A fifth mechanism for retiring an instruction in program order without updating the in-order state (effectively canceling the effects of the instruction being retired), and for resuming in-order execution of the program starting at the instruction being retired (which implies canceling all the effects present in the out-of-order state); and
6. A sixth mechanism for retiring an instruction without updating the in-order state (effectively canceling the effects of the instruction being retired).

The fourth mechanism from the immediately preceding list is used to retire instructions when the effects of the instruction being retired are correct and the instruction was on the executed path. On the other hand, the fifth mechanism is used whenever there is some abnormal condition resulting from the execution of the instruction being retired and that instruction was on the executed path, or from some external event. The sixth mechanism is used to cancel the effects of speculatively executed instructions which are off-path, regardless of whether the instructions completed correctly or encountered an abnormal condition.

Figure 5:
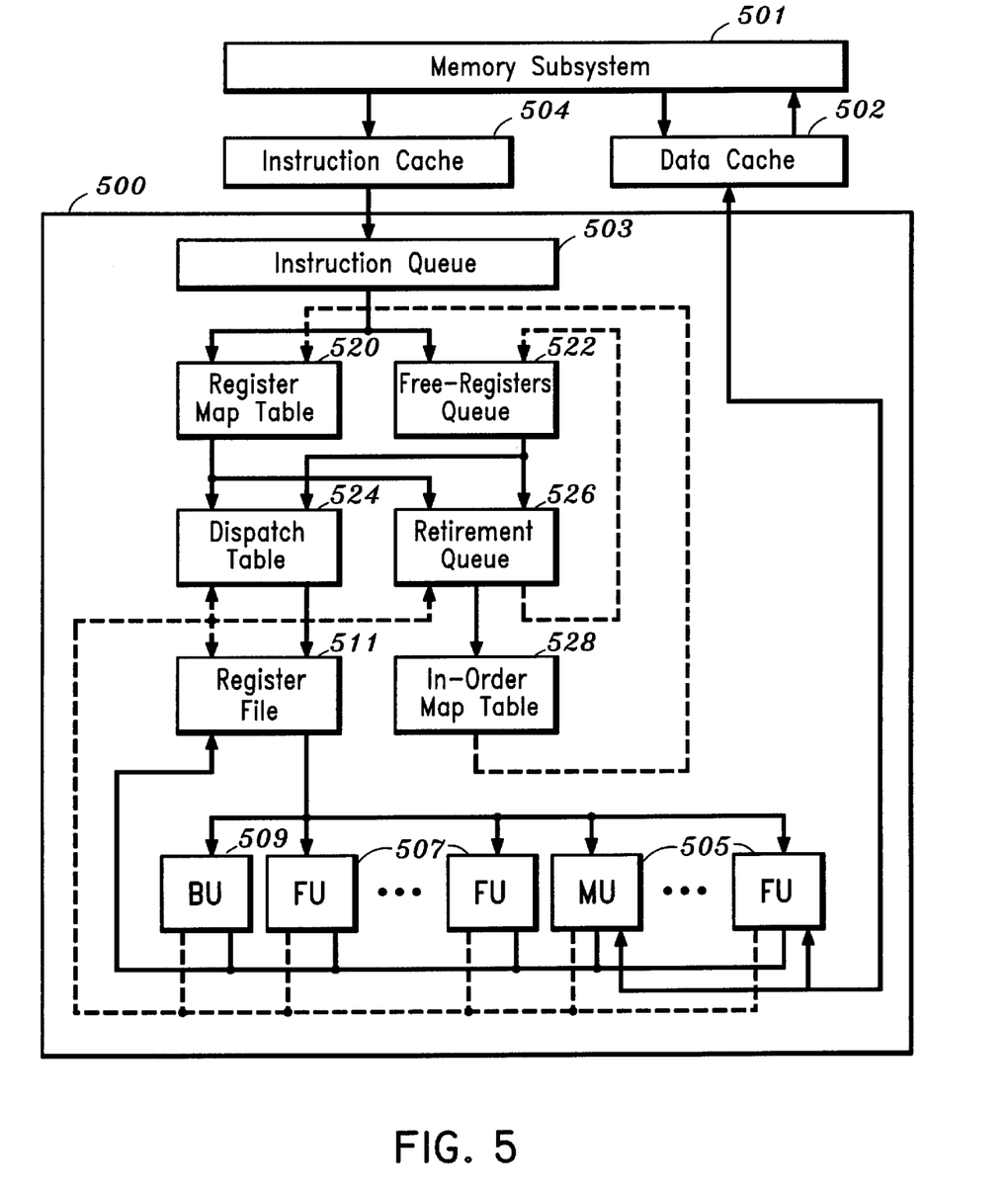
FIG. 5 is a functional block diagram of a conventional superscalar computer processing system that supports dynamic reordering of memory operations and hardware-based implementation of the interference test and recovery sequence.

FIG. 5 is a functional block diagram of a conventional superscalar computer processing system that supports dynamic reordering of memory operations and hardware-based implementation of the interference test and recovery sequence. That is, the system of FIG. 5 includes the hardware resources necessary to support the execution of out-of-order load operations before in-order memory operations.

The system includes: a memory subsystem 501; a data cache 502; an instruction cache 504; and a processor unit 500. The processor unit 500 includes: an instruction queue 503; several memory units (MUs) 505 for performing load and store operations; several functional units (FUs) 507 for performing integer, logic and floating-point operations; a branch unit (BU) 509; a register file 511; a register map table 520; a free-registers queue 522; a dispatch table 524; a retirement queue 526; and an in-order map table 528. This exemplary organization is based on the one described in the article by M. Moudgill, K. Pingali, and S. Vassiliadis, "Register Renaming and Dynamic Speculation: An Alternative Approach", Proceedings of the 26th Annual International Symposium on Microarchitecture, pp. 202–13 (December 1993), but is extended to enable multipath execution.

In the processor depicted in FIG. 5, instructions are fetched from instruction cache 504 (or from memory subsystem 501, when the instructions are not in instruction cache 504) under the control of branch unit 509, placed in instruction queue 503, and subsequently dispatched from instruction queue 503. The register names used by the instructions for specifying operands are renamed according to the contents of register map table 520, which specifies the current mapping from architected register names to physical registers. The architected register names used by the instructions for specifying the destinations for the results are assigned physical registers extracted from free-registers queue 522, which contains the names of physical registers not currently being used by the processor.

The register map table 520 is updated with the assignments of physical registers to the architected destination register names specified by the instructions. Instructions with all their registers renamed are placed in dispatch table 524. Instructions are also placed in retirement queue 526, in program order, including their addresses, and their physical and architected register names. Instructions are dispatched from dispatch table 524 when all the resources to be used by such instructions are available (physical registers have been assigned the expected operands, and functional units are free). The operands used by the instruction are read from register file 511, which typically includes general-purpose registers (GPRs), floating-point registers (FPRs), and condition registers (CRs).

Instructions are executed, potentially out-of-order, in a corresponding memory unit 505, functional unit 507 or branch unit 509. When a branch unit resolves a branch, then information relating to instructions which are off-path with respect to this branch can be safely removed from the various parts of the processor state (register map table 520, register file 511, retirement queue 526, instruction queue 503, and so forth). Upon completion of execution, the results from the instructions are placed in register file 511. Instructions in dispatch table 524 waiting for the physical registers set by the instructions completing execution are notified. The retirement queue 526 is notified of the instructions completing execution, including whether they raised any exceptions. Completed instructions which are on-path are removed from retirement queue 526, in program order (from the head of the queue). At retirement time, if no exceptions were raised by an instruction, then in-order map table 528 is updated so that architected register names point to the physical registers in register file 511 containing the results from the instruction being retired; the previous register names from in-order map table 528 are returned to free-registers queue 522.

On the other hand, if an instruction has raised an exception, then program control is set to the address of the instruction being retired from retirement queue 526. Moreover, retirement queue 526 is cleared (flushed), thus canceling all unretired instructions. Further, the register map table 520 is set to the contents of in-order map table 528, and any register not in in-order map table 528 is added to free-registers queue 522.

In addition to the components above, superscalar processors may contain other components such as branch-history tables to predict the outcome of branches.

According to the present invention, a conventional superscalar processor that supports reordering of load instructions with respect to preceding memory instructions (as shown in FIG. 5) may be augmented with a multipath load order table, and the following mechanisms:

A. A first mechanism for entering information about out-of-order load instructions into the multipath load order table with a path specifier describing the original position of the load operation (possibly including additional information to also perform basic block level memory interference checking);

B. A second mechanism to test for interference between the entries in the multipath load order table and any in-order memory operations;

C. A third mechanism to remove entries from the multipath load order table which are off-path with respect to a resolved branch;

D. A fourth mechanism to restart execution in-order when an out-of-order instruction which is on-path has been interfered with.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for scheduling instructions for execution along multiple paths in a computer processing system implementing out-of-order execution, the method comprising the steps of:

selecting and moving a next instruction from its current position in a sequence of instructions to an earlier position;

determining whether the selected instruction may reference a memory location for read-access;

determining whether the selected instruction was previously moved over a non-selected instruction which may ambiguously reference the memory location, when the selected instruction may reference the memory location for read-access;

determining whether the selected instruction was previously moved over a branch instruction, when the selected instruction was previously moved over the non-selected instruction; and storing a record of the selected instruction for future reference, when the selected instruction was previously moved over the branch instruction, the record comprising a path specifier for indicating a path from a current locus of execution to a basic block corresponding to an in-order position of the selected instruction.

2. The method according to claim 1, wherein the path specifier comprises a number of branch decisions and a direction of each branch decision.

3. The method according to claim 1, wherein said storing step is performed using one of context tags and adaptive branch trees.

4. The method according to claim 1, further comprising the steps of:
- determining whether there are instructions left to be selected; and
- returning to said selecting step, when there are instructions left to be selected.

5. The method according to claim 1, further comprising the step of disambiguating memory references within a basic block.

6. The meth o d according to claim 1, further comprising the step of adding information corresponding to basic-block interference checking to a multipath load order table of the computer processing system.

7. The method according to claim 1, wherein the non-selected instruction may ambiguously reference the memory location for at least one of a read-access and a write access.

8. The method according to claim 1, wherein the record in stored in a table comprising a plurality of entries, each given entry corresponding to a given speculative load operation and comprising a given path specifier field for storing a given path specifier.

9. A method for checking for interference between a current memory operation and previously executed load instructions in a computer processing system implementing out-of-order execution along multiple paths, the method comprising the steps of:
- storing in a table a plurality of entries, wherein each given entry corresponds to a given speculative operation and comprises an address field for storing a memory address corresponding to the given speculative load operation, and an interference field for indicating whether the given speculative operation has been interfered with;
- determining whether a current entry in the table refers to one of a speculative load operation in a current basic block and an another speculative load operation in a later basic block;
- determining whether a first interference exists between the memory address stored in the address field of the current entry and the current memory operation, when the current entry refers to the speculative load operation in the current basic block;
- initiating re-execution of the speculative load operation, when the first interference exists;
- determining whether a second interference exists between the current memory operation and the other speculative load operation in the later basic block, when the current entry refers to the other speculative load operation in the later basic block, the speculative load operation having been moved over at least one branch and the current memory operation; and
- recording the second interference in the interference field of the current entry, when the second interference exists.

10. The method according to claim 9, further comprising the step of determining whether the current entry is valid.

11. The method according to claim 10, wherein said method is performed only for current, valid entries in the table.

12. The method according to claim 9, wherein the current entry refers to a basic block which occurs later along one of a plurality of possible execution paths, when the current entry does not refer to the load operation in the current basic block.

13. The method according to claim 9, wherein said step of determining whether the current entry in the table refers to the load operation in the current basic block comprises the step of determining a current value of a branch level in a path specifier.

14. The method according to claim 9, wherein said initiating step comprises the steps of:
- discarding speculative results; and
- setting execution to resume at an instruction immediately following the current memory access.

15. The method according to claim 9, further comprising the step of discontinuing speculation along a path where the second interference has been detected, when the second interference exists.

16. The method according to claim 9, further comprising the steps of:
- selectively flushing the load operation and successor operations dependent therefrom along a path of the load operation, when the second interference exists; and
- restarting instruction fetch for the path of the speculative load operation at a location of the speculative load operation.

17. The method according to claim 9, wherein said method is applied to all of the entries in the table simultaneously.

18. A method for executing branch instructions in a computer processing system implementing out-of-order execution along multiple paths, the branch instructions being in-order with respect to a speculative operation, the method comprising the steps of:
- storing in a table a plurality of entries, wherein each given entry corresponds to a given speculative operation and comprises a path specifier field for storing a path from a current locus of execution to a basic block associated with an in-order position of the given speculative operation, and an interference field for indicating whether the given speculative operation has been interfered with;
- determining whether a current entry in the table has a same direction as a currently processed branch, using the path specifier field of the current entry;
- adjusting the path specifier field of the current entry to reflect a new locus of execution to the basic block including an in-order position of the speculative operation, when the current entry has the same direction as the currently processed branch;
- determining whether the speculative operation is in-order with respect to all branches over which the speculative operation has been previously moved;
- determining whether the interference field of the speculative operation indicates that the speculative operation has been interfered with, when the speculative operation is in-order with respect to all branches over which the speculative operation has been previously moved; and
- restarting execution at the in-order point of the currently processed branch, when the interference field of the speculative operation indicates that the speculative operation has been interfered with.

19. The method according to claim 18, further comprising the step of determining whether the current entry is valid.

20. The method according to claim 19, wherein said method is performed only for current, valid entries in the table.

21. The method according to claim 18, wherein said step of determining whether the current entry in the table has the same direction as the currently processed branch comprises the step of comparing the direction of the currently processed branch with a path specifier in the current entry.

22. The method according to claim 18, wherein said adjusting step comprises the steps of:
   shifting a branch prediction string in the current entry to the left by one; and
   reducing a number of branch levels in a branch level field in the current entry.

23. The method according to claim 18, wherein said adjusting step comprises the steps of:
   shifting a branch prediction string in the current entry to the left by one; and
   shifting a branch level string to the left a predetermined amount.

24. The method according to claim 18, further comprising the steps of marking the current entry as invalid and discarded the current entry, when the current entry does not have the same direction as the currently processed branch.

25. An apparatus for checking for interference between a current memory operation and previously executed memory operations in a computer processing system, the method comprising the steps of:
   a table comprising a plurality of entries, wherein each entry corresponds to a respective speculative operation and comprises a path specifier field for storing a path from a current locus of execution to a basic block associated with an in-order position of the given speculative operation, an address field for storing a memory address corresponding to the given speculative load operation, and an interference field for indicating whether the given speculative operation has been interfered with;
   means for entering a memory access address and a path specifier corresponding to a given speculative operation in a corresponding address field and a corresponding path specifier field of the table, respectively;
   means for determining whether interference exists between the plurality of entries in said table and the current memory operation, the current memory operation being in-order with respect to the plurality of entries in said table;
   means for removing entries from said table that are off-path with respect to a resolved branch; and
   means for restarting execution in-order when an out-of-order operation which is on-path has been interfered with.

26. The apparatus according to claim 25, wherein an entry in said table is off-path, when the entry does not have a same direction as that of the resolved branch.

27. The apparatus according to claim 26, further comprising means for terminating execution along a path having interference.

28. The apparatus according to claim 26, wherein said entering means enters the memory access address and the path specifier corresponding to the given speculative operation, when the given speculative load instruction is executed.

* * * * *